US011357353B2

(12) United States Patent
Perentes et al.

(10) Patent No.: US 11,357,353 B2
(45) Date of Patent: Jun. 14, 2022

(54) BEVERAGE OR FOODSTUFF PREPARATION SYSTEM

(71) Applicant: NESTEC S.A., Vevey (CH)

(72) Inventors: Alexandre Perentes, Sullens (CH); Laurent Seydoux, Gillarens (CH)

(73) Assignee: Societe des Produits Nestle S.A., Vevey (CH)

(*) Notice: Subject to any disclaimer, the term of this patent is extended or adjusted under 35 U.S.C. 154(b) by 266 days.

(21) Appl. No.: 16/346,596

(22) PCT Filed: Nov. 6, 2017

(86) PCT No.: PCT/EP2017/078300
§ 371 (c)(1),
(2) Date: May 1, 2019

(87) PCT Pub. No.: WO2018/087030
PCT Pub. Date: May 17, 2018

(65) Prior Publication Data
US 2019/0282024 A1    Sep. 19, 2019

(30) Foreign Application Priority Data
Nov. 8, 2016  (EP) .................................. 16197631

(51) Int. Cl.
A47J 31/44    (2006.01)
A47J 31/36    (2006.01)

(52) U.S. Cl.
CPC ....... A47J 31/3633 (2013.01); A47J 31/3638 (2013.01); A47J 31/4403 (2013.01); A47J 31/44 (2013.01)

(58) Field of Classification Search
CPC ......... A47J 31/44; A47J 31/4403; A47J 31/00
USPC .......................................................... 99/284
See application file for complete search history.

(56) References Cited

U.S. PATENT DOCUMENTS 5,070,222 A * 12/1991 Yahav .................. H05B 6/1227
219/621
8,146,485 B2 * 4/2012 Ozanne ................. A47J 31/407
99/282
2010/0181841 A1 * 7/2010 Azancot .................. H02J 50/10
307/104

(Continued)

FOREIGN PATENT DOCUMENTS

CN          1681427 A    10/2005
CN        101242762 A     8/2008
CN        101449625 A     6/2009

(Continued)

OTHER PUBLICATIONS

Chinese Office Action for Appl No. 201780064031.5 dated Dec. 20, 2020.

(Continued)

Primary Examiner — Reginald Alexander
(74) Attorney, Agent, or Firm — K&L Gates LLP

(57) ABSTRACT

A beverage or foodstuff preparation system (2) comprising: a base unit (74); a removable component (76) having a beverage or foodstuff component processing system (4); a power coupling (78) adapted for inductive power transfer of electrical energy between the base unit and the removable component when the removable component (76) is coupled with the base unit (74).

16 Claims, 8 Drawing Sheets

(56) References Cited

U.S. PATENT DOCUMENTS

2016/0166104 A1* 6/2016 Blanc .................. A47J 31/3633
99/295
2016/0336785 A1* 11/2016 Gao ........................ H02J 50/80

FOREIGN PATENT DOCUMENTS

| CN | 103326477 A | 9/2013 |
|----|----|----|
| CN | 104281117 A | 1/2015 |
| CN | 204120193 U | 1/2015 |
| CN | 105324059 A | 2/2016 |
| CN | 205092663 U | 3/2016 |
| CN | 105992540 A | 10/2016 |
| DE | 102010039071 A1 | 2/2012 |
| GB | 2255493 A | 11/1992 |
| WO | 2012020343 | 2/2012 |
| WO | 2014043652 | 3/2014 |

OTHER PUBLICATIONS

European Office Action for Application No. 17 801 372.8-1004 dated May 28, 2021.
China Patent Office Communication for Application No. 201780064031.5, dated Dec. 7, 2021, 27 pages.

* cited by examiner

BEVERAGE OR FOODSTUFF PREPARATION SYSTEM

CROSS REFERENCE TO RELATED APPLICATIONS

The present application is a National Stage of International Application No. PCT/EP2017/078300, filed on Nov. 6, 2017, which claims priority to European Patent Application No. 16197631.1, filed on Nov. 8, 2016, the entire contents of which are being incorporated herein by reference.

TECHNICAL FIELD

The present disclosure relates generally to electrically operated beverage or foodstuff preparation systems in which a beverage or foodstuff is prepared, and to power transfer to removable components that perform part of said preparation.

BACKGROUND

Beverage or foodstuff preparation systems, such as Nespresso® coffee system and Aeroccino™ milk frothing system, can be configured as a base unit and a separable removable component. The removable component comprises a beverage or foodstuff component processing system, such as a whisking system to froth milk or an extraction system to extract a beverage component from a capsule. The base unit comprises electrical circuitry to transfer power to the removable component for powering of said component processing system. Power can be transferred by means of physical contact between electrically conductive terminals arranged on the base unit and removable component. With the base unit and removable component separated said terminals are exposed and may become damaged or soiled (e.g. by beverage or foodstuff debris or corrosion from water and oxygen), thus preventing effective power transmission.

In spite of the effort already invested in the development of such preparation systems further improvements are desirable.

SUMMARY

The present disclosure provides a beverage or foodstuff preparation system comprising a base unit and a removable component. The removable component having a beverage or foodstuff component processing system. The system comprises a power coupling arranged on the removable component and base unit. The power coupling is adapted for inductive power transfer by magnetic induction of electrical energy (i.e. wirelessly) between the base unit and removable component when they are coupled. The system comprises electrical circuitry that can be arranged on the removable component and base unit for control of the electrical energy through the power coupling.

By adapting the power coupling for inductive power transfer, the electrical energy may be transferred to the removable component with the associated electrical circuitry hermetically sealed or otherwise encased, e.g. in a housing. The power coupling may be robust and safe since it is protected from fluid (including spilt liquid that is likely to be encountered in a beverage or foodstuff preparation environment) and may have a reduced risk of corrosion from elements including oxygen and water. The electrical circuitry may remain sterile, thus not requiring cleaning.

In embodiments the electrical circuitry may be adapted to determine coupling of the base unit and removable component. By determining coupling of the base unit and removable component, the power coupling may transfer electrical energy only when the base unit and removable component are operatively coupled. The power coupling may be safe due to reduced stray magnetic fields. The power coupling may be efficient since electrical energy may only be transmitted when an electrical load is present.

In embodiments the electrical circuitry may comprise an emitter arranged on the removable component, which is communicatively coupled to a receiver arranged on the base unit when the base unit and removable component are coupled. By including a communicatively coupled (i.e. arranged such that a signal emitted from the emitter is received by the receiver so that said signal can be processed to convey information) emitter and receiver, they may be used to further regulate the electrical energy transmitted by the power coupling. The power coupling may be safe and efficient since the desired amount of electrical energy (e.g. the energy required to operate the component processing system) can be transferred through the power coupling.

In embodiments the electrical circuitry upon determination of said coupling may effect electrical energy transfer in a start-up mode. The start-up mode may be for establishing communication between the emitter and the receiver. In the start-up mode the component processing system may be inoperative, e.g. electrical circuitry on the removable component does not supply electrical energy to the component processing system (including being inoperable to receive information to perform a preparation process or not performing a preparation process upon receiving said information). In the start-up mode any electrical energy transferred by the power coupling drives the emitter. By "driving" the emitter it is meant that the emitter is operated to emit a signal in response to the supplied electrical energy in real time. Thus an embodiment wherein the electrical energy is stored in an electrochemical cell (or other like configuration) and otherwise supplied to the emitter is precluded. The electrical circuitry, upon receiving a corresponding signal from the receiver, may transition from the start-up mode to a regulated mode, wherein power transfer is regulated by communication between the emitter and receiver and the component processing system is operative.

By adapting the electrical circuitry with said start-up mode, the power coupling can transfer an initial amount of electrical energy, e.g. a low amount, to power the emitter. If the emitter is not powered (e.g. due to the removable component and base unit not being operatively coupled) then the electrical circuitry may not transition from the start-up mode to the regulated mode. The power coupling may thereby be safer and/or more efficient than if it were alternatively configured with high power (e.g. to operate the component processing system) initially transferred. By transitioning from the start-up mode to the regulated mode once a signal is received at the receiver (the signal being as a result of the emission from the emitter during the start-up mode) said transition may occur when communication between the emitter and receiver is established. Thus electrical energy to operate the component processing system may be safely supplied.

In embodiments the electrical energy transferred in the start-up mode is lower than the electrical energy transferred in the regulated mode. By transferring lower energy in the start-up mode higher energy may be transferred once communication has been established between the emitter and receiver. In the event that the start-up occurs without the removable component and base unit operatively connected (e.g. due to false determination of coupling) there may be less damage to the associated electrical circuitry and the coupling may be safe.

In embodiments the start-up mode comprises a process comprising the transferred electrical energy increased from a first amount (which can include no energy transfer, e.g. a soft start) to a second amount, including by a linear or curved ramp. In embodiments wherein the electrical energy is controlled by PWM, increasing the electrical energy refers to progressively increasing a duty cycle, e.g. by a constant amount for a linear ramp or a non-constant amount for a curved ramp. By increasing the electrical energy from a first amount to a second amount a 'soft start' may be implemented to place less demand on the associated electrical circuitry. In embodiments the start-up mode comprises a process comprising a predetermined amount of time of electrical energy transfer, e.g. 100-500 micro seconds, or up to 0.5 second. The electrical energy may be increased over the time period, including in a curved or ramped manner as discussed above. By implementing a predetermined amount of time the duration of the start-up mode may be controlled. The start-up mode may comprise like processes, including the transfer of a predetermined amount of electrical energy, e.g. energy of a constant magnitude. In embodiments the processes may be combined, e.g. a master process comprising a plurality of the aforedescribed slave processes executed concurrently, wherein the master process is completed if one of the slave processes is completed.

In embodiments the electrical energy transferred in the start-up mode is terminated if the process is completed (e.g. the electrical energy is supplied from the first amount achieves the second amount or the electrical energy is supplied for the predetermined amount of time) without the corresponding signal received by the receiver, i.e. without the regulated mode being performed. By terminating the start-up mode if the process is completed, the electrical energy supplied during the start-up mode may be controlled to reduce damage to the associated electrical circuitry in the event the start-up mode occurs without the removable component and base unit operatively coupled.

In embodiments the process is repeated sequentially (e.g. following completion of a process, without the corresponding signal received by the receiver, the process is performed again) until a predetermined number (e.g. 2-4) of processes have been executed or a signal emitted by the emitter is received by the receiver. By sequentially repeating a process the electrical energy supplied during the start-up mode may be controlled to reduce damage to the associated electrical circuitry in the event the start-up mode occurs without the removable component and base unit operatively connected. In embodiments a subsequent process is executed after a predetermined amount of time (e.g. 0.5-2 seconds) from termination of the preceding process.

In embodiments the electrical energy transferred through the power coupling comprises an alternating current, including one or a combination of: a sine wave; square wave; saw-toothed, pulsating (i.e. direct current pulsating); or other like waveform. The electrical energy transferred through the power coupling may be controlled by pulse width modulation (PWM) by duty cycle or by chopping of an alternating current waveform.

In embodiments machine readable instructions are executed by one or more processors arranged on the base unit to transfer electrical energy through the power coupling based on a signal received by the receiver.

In embodiments the electrically circuitry is adapted to transfer with the power coupling continuously variable amounts of electrical energy (e.g. the transfer of electrical energy is with a number of states intermediate to on and off). The continuously variable amounts of energy may be transferred in the regulated mode (e.g. in an embodiment that implements a start-up mode and regulated mode). "Continuously variable" refers to control in a continuous manner of the amount of electrical energy that each energy pulse supplies (e.g. by duty cycle control) rather than the on/off state of a pulse. By providing continuously variable transfer of electrical energy the power coupling can transfer precise amounts of electrical energy to meet the power demands of the component processing system when performing a preparation process.

In embodiments the emitter comprises a light source adapted to emit light, the receiver adapted to determine light intensity, the electrical energy transferred by the power coupling based on the emitted light intensity. The term "light" refers to electromagnetic radiation and includes light emitted in the human-visible spectrum (e.g. by a light emitting diode (LED)) and light emitted that is not human-visible (e.g. by an infrared LED) or a combination thereof. By adapting the emitter and receiver to be optically coupled, the electrical circuitry may be cost effective and may operate without interference from magnetic fields from the power coupling.

In embodiments the removable component comprises electrical circuitry to control the component processing system to perform a beverage or foodstuff preparation process, wherein the electrical energy transmitted by the power coupling is controlled (e.g. including via the emitter and associated electrical circuitry on the base unit) based on the preparation process. By controlling the electrical energy based on a preparation process a precise amount of electrical energy to meet the power demands of the component processing system, when performing a preparation process, may be transferred. In embodiments said control may be in the regulated mode (e.g. not the start-up mode).

The electrical circuitry to control the component processing system to perform a beverage or foodstuff preparation process may comprise machine readable instructions executable by one or more processors, which may be arranged on the removable component, to control the component processing system (e.g. in an embodiment with a component processing system as a conditioning system, control may be of a heat transfer system and whisking system). The component processing system may be controlled to perform a series of operations (e.g. to apply a particular amount of heat for a predetermined amount of time and/or to apply a particular whisking force for a predetermined amount of time). The machine readable instructions may comprise instructions for operating the emitter to emit a signal corresponding to the control of the component processing system (e.g. when the electrical load from the component processing system is of a particular amount a signal is emitted so that the corresponding amount of electrical energy is supplied through the power coupling).

In embodiments the electrical circuitry to determine coupling of the base unit and removable component comprises a sensor, including a magnetic field sensor (e.g. a reed sensor arranged on the base unit, which is activated by magnetic material of the removable component when operatively coupled to the base unit) or other proximity sensor, including an optical sensor (e.g. a photo transistor, which is covered by the removable component when operatively coupled to the base unit). By implementing a sensor operative coupling can be precisely determined, which may reduce damage to the associated electrical circuitry. By implementing a magnetic field sensor, said sensor may be triggered by magnetic material on the removable component without power supplied through the power coupling to the removable component (or via a dedicated power source on the removable component).

In embodiments the power coupling comprises a primary coil arranged on the base unit and a secondary coil arranged on the removable component. A separable core may be arranged on the base unit and removable component. In embodiments the receiver and emitter are arranged within the respective primary coil and secondary coil and the sensor is external and arranged distal the coils. By arranging the emitter and receiver within the coils and the sensor distal the coil, the sensor and emitter/receiver are positioned distal each other, which may provide electrical means for determining the precise coupling of the base unit an removable component.

In embodiments the electrical circuitry is adapted to prevent transfer of electrical energy through the power coupling upon determination by the electrical circuitry of the base unit and removable component uncoupled. By preventing transfer of electrical energy when uncoupled, damage to the associated electrical circuitry may be reduced.

In embodiments the removable component and base unit comprise a mechanical interface for locating the removable component and base unit in the coupled configuration. By implementing a mechanical interface the base unit and removable component may be precisely coupled, which may lead to efficient energy transfer through the power coupling.

In embodiments the removable component comprises electrical circuitry to convert alternating current electrical energy supplied through the power coupling to direct current electrical energy to drive the emitter. In the start-up mode these components may be operated.

In embodiments the electrical circuitry is adapted to receive information for selection of a preparation process, said electrical circuitry may be arranged on the removable component and/or one the base unit. The electrical circuitry may comprise wireless communication resources. By adapting the electrical circuitry to wirelessly receive said information, a preparation process can be selected using a peripheral device or a master beverage or foodstuff preparation machine and may obviate a user interface on the removable component. In embodiments the electrical circuitry is adapted to perform a preparation process based on the received information, including upon receiving said information. Said adaptation may be implemented as suitable machine readable instructions on a processor of the removable component. The electrical circuitry may be adapted upon transfer of electrical energy through the power coupling to receive said transmission, e.g. receipt of said information may be enabled (including by powering of the communication resources). In embodiments comprising a regulated mode, said receipt may occur during the regulated mode.

In embodiments the electrical circuitry is adapted to transmit information to identify a preparation process performable by the component processing system of the removable component. The electrical circuitry may be arranged on the removable component and/or on the base unit. The electrical circuitry may comprise wireless communication resources. By adapting the electrical circuitry to wirelessly transmit said information, a preparation process performable by the removable component can be determined using a peripheral device or a master beverage or foodstuff preparation machine. It will be understood that the base unit may be coupled with a plurality of removable components that comprise different component processing systems, which are operable to perform different preparation processes. The electrical circuitry may be adapted upon transfer of electrical energy through the power coupling to perform said transmission. In embodiments comprising a regulated mode, said transmission may occur during the regulated mode.

In embodiments the system comprises a further component preparation system. The further component preparation system may be different to the component processing system of the removable component. The system may comprise electrical circuitry for control of the further component preparation system.

In embodiments the system comprises electrical circuitry (e.g. which is not arranged on the removable component) adapted to receive the information to identify a preparation process performable by the component processing system and based on said information determine a combined preparation process performable by the further component preparation system and the component preparation system of the removable component. The electrical circuitry may be arranged on one or a combination of: a master beverage or foodstuff preparation machine or the base unit that comprises the further component preparation system; a peripheral device; another component in communication with the system.

In embodiments electrical circuitry is operable to perform a combined preparation process comprising the operation of the further component processing system and the component processing system of the removable component. The component processing systems may be operated sequentially or concurrently to each other.

The present disclosure provides a removable component comprising a beverage or foodstuff component processing system. The removable component comprises a power coupling, e.g. a secondary coil of the power coupling, adapted for inductive power transfer of electrical energy from a base unit coupled with the removable component.

In embodiments the electrical circuitry may comprise an emitter arranged to communicatively couple to a receiver arranged on the base unit. The electrical circuitry may be adapted to receive electrical energy from the secondary coil for electrical energy transfer in a start-up mode. The start-up mode is for establishing communication between the emitter and receiver. In the start-up mode the component processing system may be inoperative. In the start-up mode the electrical energy may drive the emitter. The electrical circuitry upon transmitting a signal from the emitter may be adapted to transition from the start-up mode to a regulated mode, wherein electrical energy transfer is regulated by the emitter. In the regulated mode the component processing system may be operative.

The present disclosure provides a method of preparing a beverage or foodstuff comprising inductively transferring electrical energy between the base unit and removable component when they are coupled.

In embodiments the method comprises determining coupling of a removable component and base unit. The method may comprise transmitting, by inductive power transfer, electrical energy from the base unit to the removable component; receiving a signal at the base unit emitted from the removable component; regulating the transfer of electrical energy between the base unit and the removable component based on the received signal to provide electrical energy, which can be referred to as regulated electrical energy, to a beverage or foodstuff component processing system of the removable component. The method may comprise not supplying electrical energy to the component processing system during the start-up mode. The method may comprise supplying electrical energy to the component processing system during the regulated mode. The electrical energy supplied to the component processing system can be regulated according to a beverage or foodstuff preparation process.

The present disclosure provides electric circuitry for a beverage preparation system, said circuitry to perform the previously described method. The present disclosure provides a computer program, when run on programmable electric circuitry, to execute the previously described method. The present disclosure provides a computer readable medium, which may be a non-transient computer readable medium, comprising the previously described computer program.

The present disclosure provides a method of preparing a beverage or foodstuff. The method may comprise transferring electrical energy through a power coupling between a base unit and a removable component as previously described. The method may comprise transmitting information to identify a preparation process performable by a component processing system of the removable component. The method may comprise determining, based on the transmitted information, a combined preparation process performable by a further component processing system and the component processing system of the removable component. The method may comprise selecting a combined preparation process. The method may comprise performing the combined preparation process by controlling the further component processing system and the component processing system of the removable component. Controlling the component processing system may comprise transmitting information for selecting a preparation process performable by the component processing system.

The preceding summary is provided for purposes of summarizing some embodiments to provide a basic understanding of aspects of the subject matter described herein. Accordingly, the above-described features are merely examples and should not be construed to narrow the scope or spirit of the subject matter described herein in any way. Moreover, the above and/or proceeding embodiments may be combined in any suitable combination to provide further embodiments. Other features, aspects, and advantages of the subject matter described herein will become apparent from the following Detailed Description, Figures, and Claims.

BRIEF DESCRIPTION OF THE FIGURES

Aspects, features and advantages of embodiments of the present disclosure will become apparent from the following description of embodiments in reference to the appended drawings in which like numerals denote like elements.

DETAILED DESCRIPTION OF EMBODIMENTS

Figure 1:
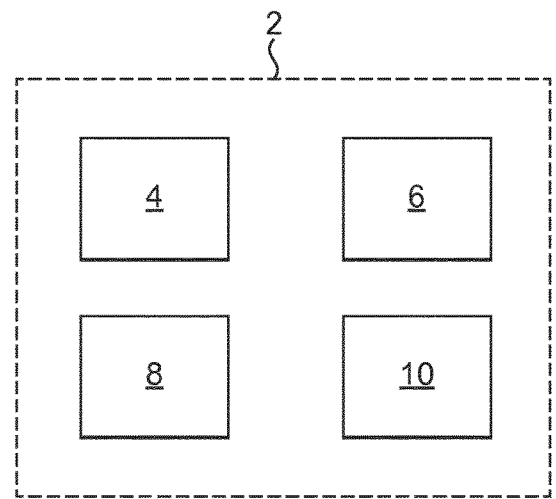
FIG. 1 is a block system diagram showing an embodiment beverage or foodstuff preparation system.

Before describing several embodiments, it is to be understood that the system is not limited to the details of construction or process steps set forth in the following description. It will be apparent to those skilled in the art having the benefit of the present disclosure that the system is capable of other embodiments and of being practiced or being carried out in various ways.

As used herein, the term "beverage or foodstuff preparation system" means a system that can prepare a beverage and/or foodstuff as defined herein, including by one or more of the following; dilution; heating; cooling; mixing; whisking; dissolution; soaking; steeping; extraction; conditioning. A beverage or foodstuff preparation system may prepare at least part of the beverage and/or foodstuff (e.g. a beverage as defined herein is prepared by said system, to which the end-user may manually add extra fluid prior to consumption, including milk and/or water).

As used herein, the term "beverage" means a potable substance. A beverage may be chilled or hot. Non-exhaustive examples of which are: tea; coffee, including ground coffee; hot chocolate; milk; cordial; or the like.

As used herein, the term "foodstuff" consists of liquids, gels, pastes, foams or mousse, semi-solids, which are capable of nutriment. A foodstuff may be chilled or hot. Non-exhaustive examples of which are: yoghurt; mousse; parfait; soup; ice cream; sorbet; custard; smoothies. It will be understood that there is a degree of overlap between the definitions of beverage and foodstuff. That is to say a beverage can also be a foodstuff and thus a machine that is said to prepare a beverage or foodstuff does not preclude the preparation of both.

As used herein, the term "beverage precursor" or "beverage forming precursor" means one or more ingredients of a beverage that are processed by the system via the addition thereto of a liquid, including milk and/or water, to form the beverage. The form of said precursor can include a powder, crystalline, liquid or gel, solid. Generally said precursor includes raw materials, including ground coffee, tea, coco powder, and powdered milk.

As used herein, the term "foodstuff precursor" or "foodstuff forming precursor" means one or more ingredients of a foodstuff that are processed by the system via the addition thereto of a liquid, including milk and/or water, to form the foodstuff. The form of said precursor can include a powder, crystalline, liquid or gel, solid. Said precursor includes raw materials, including powdered produce, e.g. dried vegetables or stock as anhydrous soup powder, powdered milk, flour based powders including custard, powdered yoghurt or ice-cream.

As used herein, the term "precursor" for convenience may refer to the aforedescribed foodstuff forming precursor or beverage forming precursor. It will be understood that said precursor may be defined as beverage or foodstuff precursor depending on the final product it is processed into.

As used herein, the term "component" or "beverage or foodstuff component" includes a single or plurality of constituents that are processed by the component processing system to a beverage or foodstuff as defined herein. A component includes in situ a beverage or foodstuff forming precursor in itself as defined herein, and a container as defined herein containing said precursor. A component includes a fluid (e.g. a liquid such as milk or water), that can be added to said precursor or processed in itself by conditioning as defined herein.

As used herein, the term "conditioning" in respect of a fluid component means to change a physical property thereof and can include one or more of the following: heating; cooling; agitation (including frothing via whipping to introduce bubbles, and mixing to introduce turbulence).

As used herein, the term "component processing system" or "beverage or foodstuff component processing system" means a system that can process a component as defined herein into the associated beverage or foodstuff as defined herein. Said processing includes: by means of the addition of fluid (e.g. a liquid including milk or water) to the component; or by conditioning as defined herein of the component (e.g. milk) without the addition of a liquid; or a combination thereof. The component processing system may be arranged to process the component by one of more of the following: dilution; heating; cooling; mixing; whisking; dissolution; soaking; steeping; extraction; conditioning. It will be understood that component processing system is not limited to the specific embodiments described herein. The component processing system is controlled to perform a preparation process as defined herein.

As used herein, the term "preparation process" or "beverage or foodstuff preparation process" means a process to prepare a beverage or foodstuff as defined herein from a beverage or foodstuff component as defined herein. A preparation process is performed by the component processing system.

As used herein, the term "container" includes an arrangement operable to contain the beverage or foodstuff forming precursor as defined herein, which is operable with the component processing system as defined herein. A container includes a configuration for containment of a single serving, pre-portioned amount of beverage or foodstuff forming precursor for processing into a single serving of beverage or foodstuff. A container includes a disposable container to the extent that it is perforated or otherwise rendered unusable after processing. The container includes various forms, such as a frustoconical, disk or other. A container may be defined as a capsule, whereby a capsule may have an internal volume of 20-100 ml. A capsule includes a coffee capsule, e.g. a Nespresso® classic capsule or other like capsule/pod. A container may be defined as a pot, whereby a pot may have an internal volume of 150-350 ml. Pot is typically for end user consumption therefrom, and includes a yoghurt pot, for consumption via an implement including a spoon. A container may be defined as a cup, whereby a cup may have an internal volume of 150-350 ml. Cup is typically for end user consumption therefrom via drinking. A container may be defined as a packet, whereby a packet is formed from a flexible material, including plastic or foil.

As used herein, the term "electrical circuitry" includes circuitry operable to provide control of the various systems defined herein including the component processing system(s). The electrical circuitry may be distributed, including distributed arrangements on the beverage or foodstuff preparation system. The electrical circuitry may also be distributed on another component in communication with the system, which may include: a networked-based computer, including as a remote server; or cloud-based computer, including a server system; or a peripheral device. The electrical circuitry may comprise electrical components, including passive components e.g. combinations of transistors, transformers, resistors, capacitors or the like. The electrical circuitry may be at least partially embodied on a processor (or one or more processors), including as an ASIC, microcontroller, FPGA, microprocessor, state machine or the like. It will be understood that one or more processors may be distributed, including arranged on the same machine as the component processing system, or another component in communication with the system. A processor can include a computer program, i.e. machine readable instructions, stored on a memory and/or programmable logic, which may be for execution of a process. The memory can be a computer-readable medium. The process may include a beverage or foodstuff preparation process, wherein the component processing system is controlled for said preparation.

As used herein, the term "computer readable medium" includes conventional non-transient memory, for example, random access memory (RAM), a CD-ROM, a hard drive, a solid state drive, a flash drive, a memory card, a DVD-ROM, a floppy disk, an optical drive, and/or combinations thereof. It is to be understood that while one or more memories may be located in the same physical location as the host beverage or foodstuff preparation system, the one or more memories may be located remotely from the host system, and may communicate with the one or more processor via a computer network. Additionally, when more than one memory is used, a first memory may be located in the same physical location as the host system, and additional memories may be located in a remote physical location from the host system. The physical location(s) of the one or more memories may be varied. Additionally, one or more memories may be implemented as a "cloud memory" (i.e., one or more memory may be partially or completely based on or accessed using the network).

As used herein, the term "peripheral device" comprises electronic computer devices including: a cell phone; a PDA; a video game controller; a tablet; a laptop; or other like device.

As used herein, the term "communication resources" refers to hardware and/or firmware for electronic information transfer. Wireless communication resources includes hardware to transmit and receive signals by radio, and includes a various protocol implementations e.g. the 802.11 standard described in the Institute of Electronics Engineers (IEEE) and Bluetooth™ from the Bluetooth Special Interest Group of Kirkland Wash. Wired communication resources includes a modulated signal passed through a power line. Said modulation may comprise a power-line communication protocol (PLC), including the Institute of Electronics Engineers (IEEE) G3-PLC and PRIME protocols.

As used herein, the term "removable component" includes a component processing system as defined herein, which may operate on its own, or in conjunction with a separate component processing system of a base unit, to prepare the beverage/foodstuff. A removable component includes electrical circuitry as defined herein. A removable component is coupleable to a base unit for the receipt of electrical energy therefrom for operation of the component processing system.

As used herein, the term "base unit" includes a power supply and electrical circuitry as defined herein. A base component is coupleable to a removable component for the supply of electrical energy thereto. A base unit may include a dedicated component processing system as defined herein, which may operate in conjunction with a separate component processing system of the removable component, to prepare the beverage/foodstuff.

[Beverage or Foodstuff Preparation System]

Referring to FIG. 1, a beverage or foodstuff preparation system 2 (hereon system 2) comprises a beverage or foodstuff component processing system 4 (hereon component processing system 4) for processing of a component as defined herein to a beverage or foodstuff. Embodiment component processing systems 4 will be discussed.

The system 2 comprises control electrical circuitry 6 for control of the component processing system 4. The electrical circuitry 6 is operable to control the supply of electrical energy to the component processing system 4. Embodiment electrical circuitry 6 will be discussed.

The system 2 comprises a power supply 10 for supply of electrical energy to the electrical circuitry 6, the component processing system 4. In embodiments the power supply 10 comprises a connection to a mains electrical supply, and may comprise means for conditioning the mains electrical energy to be suitable for the electrical circuitry 6 and component processing system 4. In embodiments the power supply 10 comprises a portable electrical energy supply, including an electrochemical cell.

[Beverage or Foodstuff Component Processing Systems]

In embodiments the component processing system 4 comprises a fluid supply system 8 for supply of fluid (e.g. to an extraction system, dissolution system or mixing system, embodiments of each will be discussed). The fluid supplied may be water or milk or other such substance. The supplied fluid may be conditioned as defined herein, by the fluid supply 8. Embodiment fluid supply systems 8 will be discussed. In embodiments the component processing system 4 does not require the supply of fluid (examples include a conditioning system, embodiments of which will be discussed), the fluid supply system 8 is thus obviated.

Figure 2:
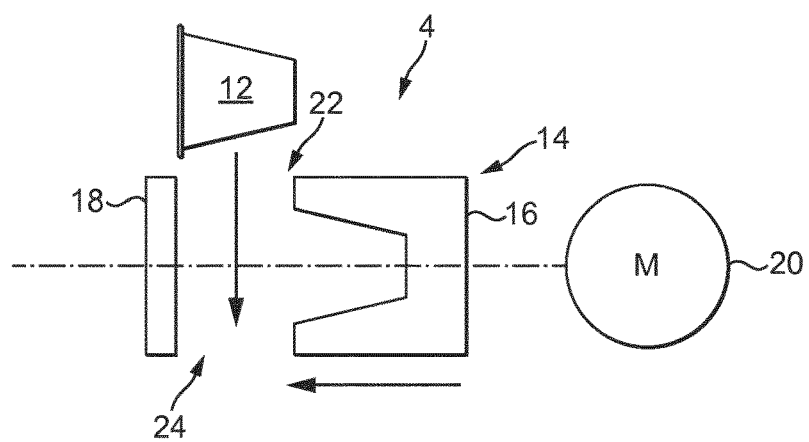
FIG. 2 is a schematic diagram showing an embodiment component processing system of the beverage or foodstuff preparation system of FIG. 1.

Referring to FIG. 2, the component processing system 4 is arranged as an extraction system. The extraction system is adapted to extract a beverage or foodstuff (or a component thereof), including via soaking and steeping, of beverage or foodstuff forming precursor arranged in a capsule 12.

The extraction system comprises an extraction unit 14 to process the capsule. The extraction unit 14 comprises a capsule holder 16 to hold the capsule in a processing position (not shown). The extraction unit 14 comprises an outlet wall 18 adapted to outlet the extracted component. The outlet wall 18 comprises one or more apertures (not shown) for said outlet in combination with filtering particles of the beverage or foodstuff forming precursor and/or support of a bursting diaphragm of the capsule. The capsule holder 16 is operable to move laterally relative the outlet wall 18 to facilitate the extraction unit 14 arranged in: a capsule receiving position (as illustrated); a capsule processing position (not illustrated, wherein the capsule is pressed between the capsule holder and outlet wall); and an intermediate ejection position (not shown) wherein a spent capsule is ejected. The extraction system comprises a drive system 20 to drive the extraction unit 14 between said positions. The drive system 20 may comprise a linear actuator, including a motor driving a rod via a gear assembly, a solenoid or a manually actuated mechanism, or other suitable mechanism. The extraction system comprises an inlet duct 22 for supply of the capsule to the extraction unit 14. The extraction system comprises an outlet duct 24 for transmission of a spent capsule from the extraction unit 14. The extraction system comprises an injector (not shown) to inject fluid from an outlet of the fluid supply into the capsule 12. The injector can be arranged on the capsule holder 16 or outlet wall 18.

In embodiment variations of the above (not illustrated) the extraction unit may be adapted to use the pressure of the fluid supplied by the fluid supply system 8 to hydraulically seal around the capsule during extraction, as disclosed in EP2142054 B. The outlet wall may be driven by the drive system rather than or in addition to the capsule holder. The extraction unit may have a vertical or other non-lateral movement and/or arrangement. The extraction system may be configured to operate with various shapes of capsules, including a disc shape. A suitable extraction system is disclosed EP2747611 A and WO2011042400.

In embodiments (not illustrated), the extraction system is adapted to operate via centrifugation of a capsule, whereby extraction is effected by centrifugal force to transmit fluid through beverage or foodstuff forming precursor. A suitable extraction system is disclosed in EP 2594171 A1.

In embodiments (not illustrated), the component processing system 4 is arranged as a dissolution system. The dissolution system is adapted to prepare beverage or foodstuff via dissolution of dissolvable beverage or foodstuff forming precursor using fluid from the fluid supply 8. The dissolution system may be adapted to operate in conjunction with a capsule, whereby the precursor is dissolved in the capsule, using fluid from the fluid supply 8, and transmitted therefrom. A suitable dissolution system is disclosed in EP 1472156 and in EP 1784344. Alternatively, the dissolution system may be adapted to operate in conjunction with a reservoir of the beverage or foodstuff forming precursor. In particular, a portioned amount of the precursor supplied by mechanical supply means (including an auger driven by a rotary actuator or other suitable means) from the reservoir to a mixing chamber and fluid from the fluid supply dissolves the precursor in the mixing chamber. A suitable dissolution system is disclosed in EP2512303 A and WO2016016240.

In embodiments (not illustrated), the component processing system 4 is arranged as a dissolution and/or extraction system that operates in conjunction with a packet. The system is adapted to receive a packet and to inject, at an inlet thereof, fluid from the fluid supply system 8. The injected fluid mixes with precursor within the packet, which exits the packet via an outlet thereof. The system comprises: a support mechanism to receive an unused packet and eject a spent packet; an injector configured to supply fluid to the packet from the outlet of the fluid supply system 8. A suitable system is disclosed in WO 2014/125123.

In embodiments (not illustrated), the component processing system 4 is arranged as a mixing system that operates in conjunction with a pot for end user consumption therefrom, (examples include a yoghurt pot). In particular, said system may supply fluid from the fluid supply system to beverage or foodstuff forming precursor arranged in the pot. The mixing system comprises an agitator, such as an electrically driven mixer to mix the fluid with the precursor. A suitable system is disclosed in PCT/EP13/072692. In embodiments of the mixing system the precursor may be prearranged in the pot prior to processing. Alternatively, the mixing system may comprise an additional separate system to extract the precursor from a capsule or packet or other suitable container and transfer said precursor to the pot for processing. A suitable system is disclosed in EP14167344A and in EP15195547A.

Figure 3:
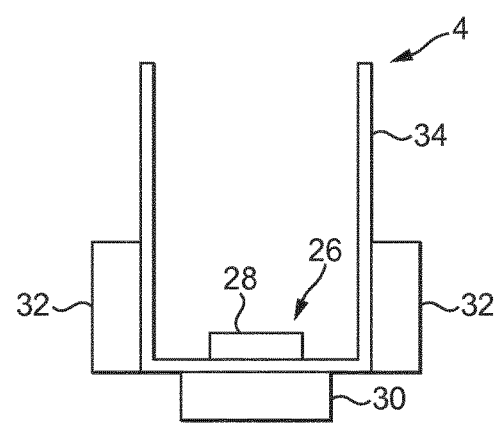
FIG. 3 is a schematic diagram showing an embodiment component processing system of the beverage or foodstuff preparation system of FIG. 1.

Referring to FIG. 3, the component processing system 4 is arranged as a conditioning system. The conditioning system is arranged to condition, as defined herein, a beverage or foodstuff component as a fluid, which may include milk, water or a solution of precursor (such as chocolate powder for forming a hot chocolate beverage in milk or water) or other. The conditioning system comprises a whisking system 26 to agitate, as defined herein, the fluid. The whisking system 26 comprises a movable element 28 driven by a drive system 30. The drive system 30 may comprise: an electrical motor to drive the movable element 28 via a mechanical coupling; a magnetic coupling that drives the element by means of an induced force from a magnetic field; other suitable system. The conditioning system comprises a heat transfer system 32 adapted to heat or cool the fluid. In embodiments where heat is applied the heat transfer system 32 transfers heat to the fluid by means of an electrically operated heating system, which may include one or more electrically resistive heating elements. In embodiments where cooling is applied the heat transfer system 32 transfers heat from the fluid by means of an electrically operated cooling system, which may include a vapour-compression refrigeration system. The whistling system 26 and heat transfer system 32 are arranged to act upon fluid arranged in a container 34.

In embodiment variations (not illustrated), the conditioning system comprises either the whisking system or the heat transfer system. In embodiments the fluid supply system 8 supplies fluid to the condition system. Alternatively, the fluid is user supplied, thus obviating the supply system 8.

[Fluid Supply System]

Figure 4:
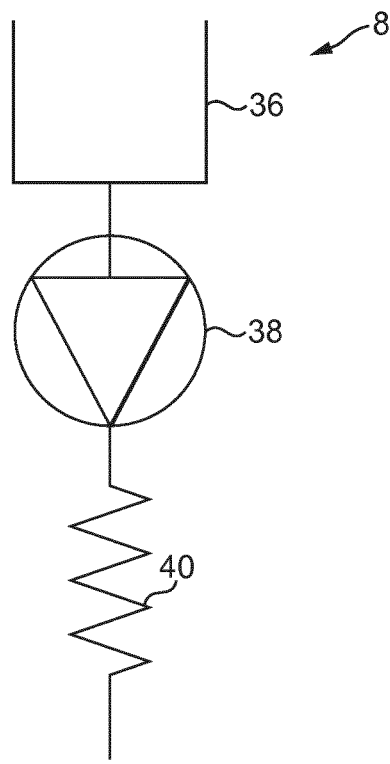
FIG. 4 is a schematic diagram showing an embodiment fluid supply system of the beverage or foodstuff preparation system of FIG. 1.

Referring to FIG. 4, embodiment fluid supply systems 8, will now be described. The fluid supply system 8 comprises a reservoir 36 for containment of the supplied fluid. The fluid supply system 8 comprises a pump system 38 for pumping of the fluid from the reservoir 36 through a heat transfer system 40 to suitable component processing systems. The fluid supply system 8 comprises a heat transfer system 40 adapted to heat or cool the fluid. In embodiments where heat is applied the heat transfer system 40 transfers heat to the fluid by means of an electrically operated heating system, which may include one or more electrically resistive heating elements, which can be arranged as a thermoblock. In embodiments where cooling is applied the heat transfer system 40 transfers heat from the fluid by means of an electrically operated cooling system, which may include a vapour-compression refrigeration system. The reservoir 36, heat transfer system 40 and pump 38 are fluidically connected by fluid transmitting conduits. In embodiments, fluid is supplied by the fluid supply system 8 at high pressure, such as 5-20 bar.

In embodiment variations of the fluid supply system 8 (which are not illustrated) the fluid supply system may comprise a connection to a water main, thus obviating the reservoir. The fluid may be pumped at room temperature thus obviating the heat transfer system. The heat transfer system and pump system may be arranged upstream or downstream of each other. The fluid may be gravitationally fed, or via a water main connection be pressure fed, thus obviating the pump and/or reservoir.

[Control Electrical Circuitry]

Figure 5:
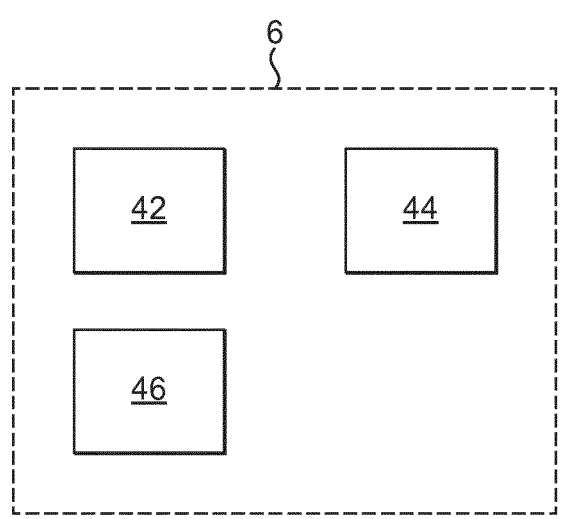
FIG. 5 is a block system diagram showing embodiment electrical control circuitry of the beverage or foodstuff preparation system of FIG. 1.

Referring to FIG. 5, the electrical circuitry 6, comprises a user interface 42 to receive a user command to execute a preparation process. In embodiments, the electrical circuitry 6 may be operable to control the component processing system 4 to perform a plurality of preparation processes, whereby the user interface 42 is adapted to enable the selection of each of the preparation processes. The user interface 42 may include one or more of the following: buttons, such as a joystick button or press button; joystick; LEDs; graphic or character LCDs; graphical screen with touch sensing and/or screen edge buttons; other like devices.

In embodiment variations (not illustrated) the user interface may be distributed, including on the system 2 and on a separate component, which can include a peripheral device as defined herein. In such embodiments, the system 2 comprises communication resources to interface with the peripheral device. In embodiments the system 2 may execute a single preparation process upon receiving electrical energy, thus obviating the user interface.

The electrical circuitry 6 comprises a sensor system 44 for providing feedback based control of the component processing system. The sensor system 44 may include one or more of the following: position sensors (e.g. in respect of an embodiment comprising an extraction system for determining the position of the extraction unit); temperature sensors (e.g. for determining the temperature of the fluid supplied by the fluid supply system); flowrate sensors for determining the flow rate of fluid supplied by the fluid supply system; other like sensors, which may be selected for the particular embodiment of the component processing system.

In embodiments variations (not illustrated) the electrical circuitry 6 may control the component processing system 4 by means of open loop control, thus obviating the sensor system. In embodiment variations (not illustrated) the electrical circuitry 6 controls the component processing system 4 by means of the actuation of electrically operated switches, which control the electrical energy supplied from the power supply 10 to various sub-components of the system 4. The electrically operated switches can comprise various transistors such as a MOSFET and the like.

Figure 6:
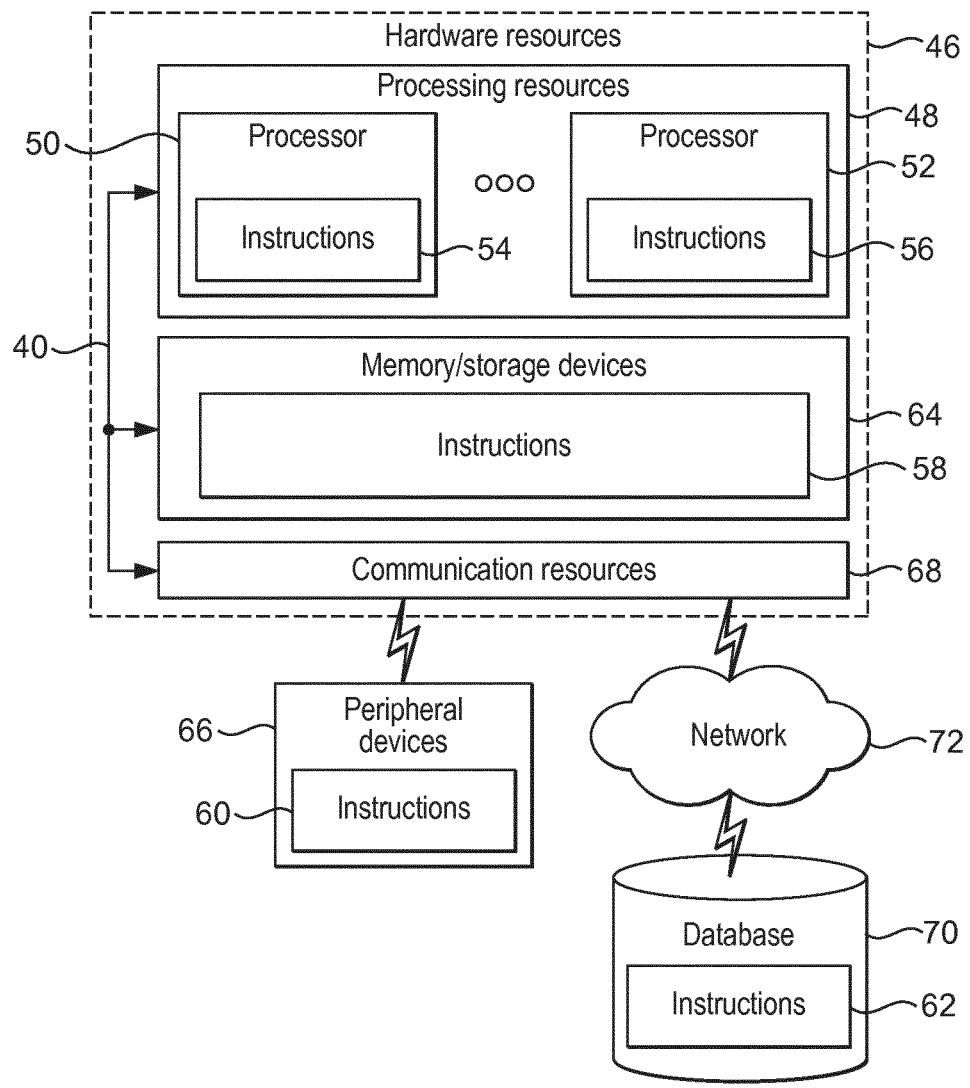
FIG. 6 is a block system diagram showing embodiment electrical circuitry of the beverage or foodstuff preparation system of FIG. 1.

Referring to FIGS. 5 and 6, embodiment electrical circuitry 6 comprises hardware resources 46. The hardware resources 46 include processing resources 48. The processing resources 48 comprise one or more processors 50, 52, as defined herein, adapted to execute machine readable instructions 54-62. The instructions may implement a preparation process for the control of the component processing system, or other like process. In embodiments the instructions 54, 56 are arranged on the one or more processors 50, 52. In embodiments the instructions 58 are arranged on separate memory/storage devices 64. In embodiments the instructions 60 are arranged on peripheral devices 66 as defined herein, which are in communication with the host system by means of the communication resources 68. In embodiments the instructions 62 are arranged on a remote database 70 (including a network-based or cloud-based system), which is in communication with the host system by means of the communication resources 68 over a computer network 72. The memory/storage devices 64 can be implemented as computer-readable medium as defined herein.

[Removable Component and Base Unit]

Figure 7:
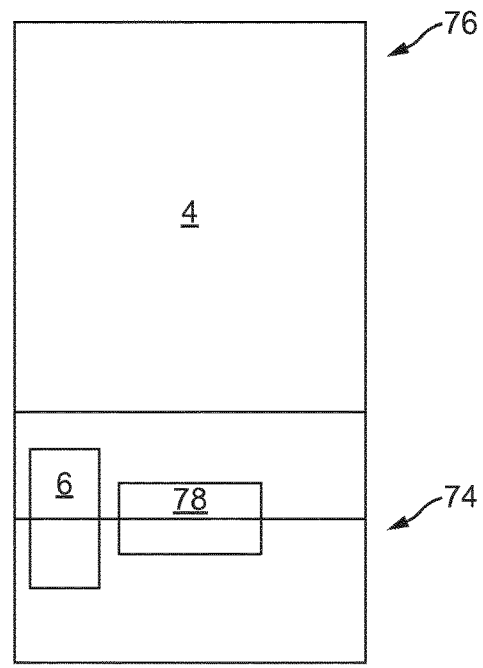
FIG. 7 is a schematic diagram showing a side view an embodiment of the beverage or foodstuff preparation system of FIG. 1, which comprises a removable component coupled with a base unit.

Referring to FIG. 7, in an embodiment aforedescribed beverage or foodstuff preparation system is arranged as a base unit 74 and a removable component 76. The removable component 76 comprises the component processing system 4. The system comprises a power coupling 78 arranged on the removable component 76 and base unit 74. The power coupling 78 is adapted for inductive power transfer of electrical energy between the base unit 74 and the removable component 76 when they are operatively coupled (as shown). The system comprises electrical circuitry 6 that is arranged on the removable component 76 and/or on the base unit 74 for control of the electrical energy through the power coupling 78.

Figure 8:
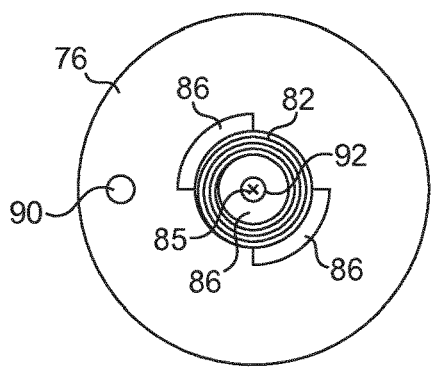
FIG. 8 is a schematic diagram showing a bottom view of the removable component of the beverage or foodstuff preparation system of FIG. 7.
Figure 9:
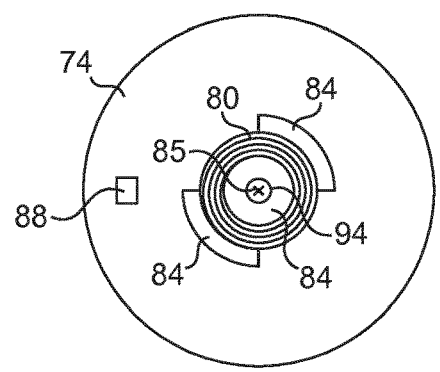
FIG. 9 is a schematic diagram showing a top view of the base unit of the beverage or foodstuff preparation system of FIG. 7.
Figure 10:
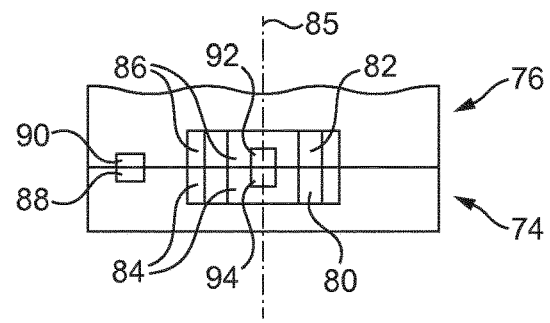
FIG. 10 is a schematic diagram showing a side sectional view of a power coupling arranged in an operative configuration of system of FIG. 7.

Referring to FIGS. 8-10, an example of the preceding embodiment comprises the power coupling with a primary coil 80 arranged on the base unit 74 and a secondary coil 82 arranged on the removable component 76. The coils 80, 82 are arranged about a common longitudinal axis 85 when the base unit 74 and the removable component 76 are operatively coupled (as shown). The coils 80, 82 comprise a plurality of electrically insulated circular windings of conductive element (e.g. copper), each of which are sheathed with insulating material (not shown). The insulating material covers the exterior surface of the winding to provide adequate insulation. In embodiments copper winding material has a diameter of 0.5 mm, with a winding fill-factor of 0.5 and a gap between turns of 0.51 mm. There may be a winding ratio of 1:1 or other depending on step-up/down requirements, e.g. 1:3. The outer coil diameter may be about 246 mm with approximately 120 turns.

A separable core 84, 86 is arranged respectively on the base unit 74 and removable component 76. The core is formed of ferrite or other suitable material. In embodiments the core is a pot core. The core 84, 86 is arranged to confine and guide magnetic fields coupling the coils 80, 82. The core may experience, from the coils, a maximum flux density of 0.20-30 Tesla. The core 84, 86 is arranged to extend around the periphery of the respective coils 80, 82 and in particular along a peripheral side that extends parallel to the longitudinal axis 85. The core 84, 86 is arranged within the respective coils 80, 82, as extensions parallel to the longitudinal axis 85.

Referring to FIG. 10, with the base unit 74 and removable component 76 operatively coupled, the coils 80, 82 are communicatively coupled with a magnetic field formed by electrical current in the primary core 80 inducing an electrical current in the secondary coil 82 and the converse. The term "operatively coupled" refers to the removable component 76 and base unit 74 coupled for inductive power transfer by means of the power coupling 78, i.e. with the coil 80 aligned to the coil 82.

In embodiments, the power coupling 78 is adapted to transfer a maximum of 200-500 Watts, with an input/output voltage of 200-350 Volts and a switching frequency of 30-300 kHz.

In embodiment variants (not illustrated) the power coupling comprises alternatively arranged coils, e.g. coils arranged about and axis perpendicular to the longitudinal axis. In embodiments the core is omitted, with inductive power transfer due to the coils. In embodiments the coils and core are alternatively arranged, including a core that is not separable or a core arrangement that is square or rectangular shaped, with the coils arranged around opposed edges. In embodiments plates comprise an emitter and receiver instead of primary and secondary coils.

Referring to FIGS. 8-11, to determine operative coupling of the base unit 74 and removable component 76, the electrical circuitry 6 comprises a magnetic field sensor 88 (i.e. a reed switch, which in embodiments is normally-open) arranged on the base unit 74. The sensor 88 is activated by magnetic material 90 arranged on the removable component 76. The sensor 88 and magnetic material 90 are arranged sufficiently distal the coils 80, 82 (e.g. greater than 5 mm away from the periphery of a coil) so that the magnetic fields induced by the coils do not incorrectly trigger the sensor 88.

In embodiment variants (not illustrated) the sensor is arranged on the removable component and the magnetic material arranged on the base unit. In embodiments the sensor comprises an optical sensor, including a photo diode, a pressure sensor, or other suitable proximity based sensor. The sensor may be alternatively arranged, including within the coils. In embodiments operative coupling is determined based on electrical load detection through the primary coil, which is determined by the electrical circuitry of the base unit, e.g. the secondary coil and associated load of the removable component causes a reflected impedance on the primary coil of the base unit, which causes decrease in current amplitude that is measured by said electrical circuitry of the base unit. In embodiments operative coupling is user determined by user actuation of a dedicated switch.

Referring to FIGS. 8-11, the electrical circuitry comprises an emitter 92 arranged on the removable component 76 and a complimentary receiver 94 arranged on the base unit 74. The receiver 94 and emitter 92 are communicatively coupled with removable component 76 and base unit 74 operatively coupled, as best seen in FIG. 10. The emitter 92 thus emits a signal that is received by the receiver 94, which can be used to regulate electrical energy through the power coupling. In embodiments an amplitude of the signal emitted is proportional to the power applied. The receiver 94 and emitter 92 are arranged within the respective primary coil 80 and secondary coil 82.

In embodiments the emitter 92 comprises a light source adapted to emit light, e.g. a light emitting diode (LED), including an infra-red LED (IRLED) or other suitable light source. The receiver 92 is adapted to convert a light intensity into a correspondingly proportioned electrical current, e.g. the receiver 92 comprises a photo diode or photo transistor or like component. In embodiments implementing pulse width modulation (PWM), it will be understood that portioning of the electrical current refers to control of the duty cycle. The emitter and receiver thus implement opto-coupler topology.

In embodiment variations (not illustrated), the emitter and receiver are communicatively coupled by coded pulses, rather than intensity, or other suitable means. The emitter and receiver may comprise other coupler topology, including acoustic-coupled topology or magnetic-coupled topology. In embodiments the emitter and receiver are alternatively arranged, including external of the coils.

Figure 11:
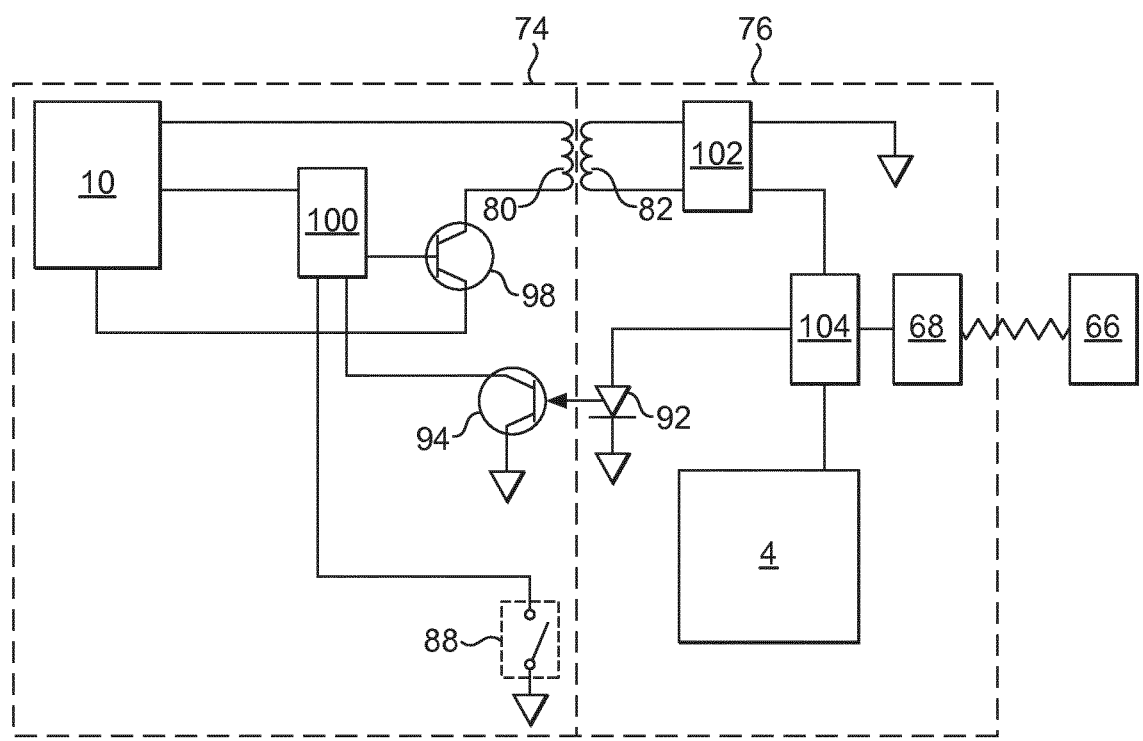
FIG. 11 is a block system diagram showing embodiment electrical circuitry of system of FIG. 7.

Referring to FIG. 11, the power supply 10 comprises (in embodiments that receive electrical energy as alternating current) an alternating current (AC) to direct current (DC) rectifier (not shown), i.e. rectifier circuitry. The electrical circuitry comprises an electrically operated switching system 98. The switching system 98 can be implemented with one or more transistors, e.g. a MOSFET or other suitable electrically operated switch. The switching system 98 switches DC electrical energy through the primary coil 80 to provide a variable current to induce a magnetic field for electrical energy transfer to the secondary coil 82. The electrical circuitry comprises a processor 100 for control of the switching system 98. The processor 100 may implement pulse width modulation (PWM) by duty cycle control to control the electrical energy supplied to the primary coil 80.

In embodiment variations (not illustrated) AC electrical energy is supplied from the power supply to the primary coil, wherein the electrical energy supplied is controlled by means of an electrically operated switch to chop said AC electrical energy. In embodiments the electrical energy is controlled by clipping of peak voltage, e.g. via a variable resistor clipper.

The electrical circuitry comprises a rectifier 102 arranged on the removable component 76 to convert the AC electrical energy induced in the secondary coil 82 to DC electrical energy for operating the processor 104. The processor 104 controls the emitter 92 to emit a signal. The signal is received by the receiver 94 and processed by the processor 100 to determine the amount of electrical energy to be supplied to the primary coil (by means of the processor 100 controlling the switching system 98).

The processor 104 controls the component processing system 4 to perform a preparation process as described previously. As part of said control, the processor 104 controls the emitter 92 to emit a signal according to the power demands of the component processing system 4 during the preparation process. The electrical circuitry of the removable component 76 may comprise a capacitor (not shown) to control the output of electrical energy from the rectifier 102 to the processor 104. In an embodiment wherein the component processing system 4 comprises the aforedescribed conditioning system schematically illustrated in FIG. 3, the power through the power coupling 78 is regulated to supply the heat transfer system 32 and/or whisking system 26 with the desired amount of power at a particular time according to the preparation process.

In embodiment variations (not illustrated) electrical energy is passed directly through the power coupling 78 to the component processing system 4, wherein the amount of electrical energy is controlled by the processor 100 (or other implementation of the electrical circuity) of the base unit 76, thus obviating the processor 104 and rectifier 102 of the removable component 76. In such an embodiment the emitter and receiver coupling may be omitted, or utilised in a more simplistic configuration, wherein the emitter taps the electrical energy to the component processing system to provide an on or off signal to the receiver. In embodiments the processor 104 of the base unit 74 is replaced by passive electrical component in accordance with "electrical circuitry" as defined herein.

The electrical circuitry of the removable component 76 comprises wireless communication resources 68, as described herein, to receive information for selection of a preparation process. The information may be transmitted from a master beverage or foodstuff preparation machine (as will be discussed), from the base unit 74, and/or from a peripheral device 66 as described herein or other suitable device. Upon receiving said information the electrical circuitry may perform said process.

In embodiments the information comprise an identifier, which corresponds to a particular preparation process stored on the processor 104 (or an associated memory/storage device). In embodiments the information comprises a set of machine readable instructions that comprise the preparation process and are executable by the processor 104. In embodiments the information comprises a combination of the two directly preceding embodiments or other suitable encoding of information. The communication resources 68 communicates the received information to the processor 104, which executes the preparation process corresponding to the information.

In embodiments (not illustrated) the removable component 76 receives said information by means of wired communication resources as defined herein, which may include a modulated signal passed through the power coupling, which is demodulated by the processor 104 (or other implementation of the electrical circuitry), thus obviating the wireless communication resources 68. In embodiments wireless communication resources are arranged on the base unit 74 to receive said information from a peripheral device, wherein the information may be communicated to the removable device by wireless or wired communication resources.

Figure 12:
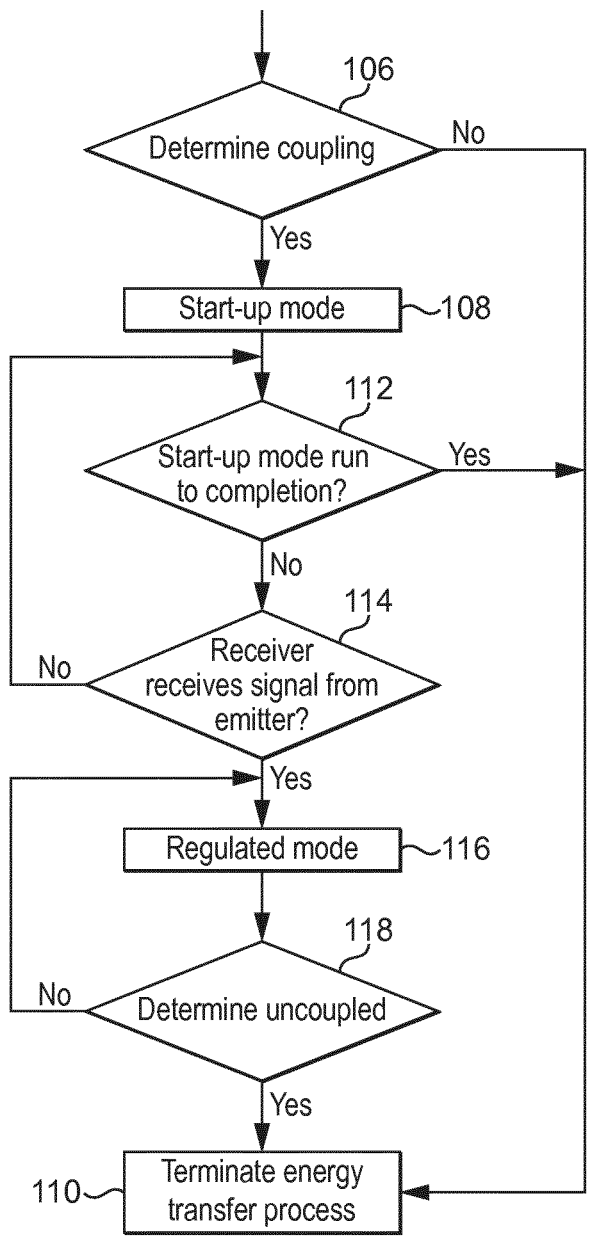
FIG. 12 is a flow chart showing an embodiment energy transfer process for the system of FIG. 7.

Referring to FIGS. 12 and 11, in embodiments the processor 100 implements an electrical energy transfer process schematically illustrated in FIG. 12 for electrically coupling the removable component 76 and base station 74. The energy transfer process comprises one or more of the following stages.

At condition 106 the electrical circuitry determines said coupling, e.g. by means of the sensor 88 (or other embodiment detection means). If coupling is determined then the determination triggers, at processor 100, a start-up mode at block 108. Else the energy transfer process is not executed at block 110.

At block 108 a start-up mode is implemented wherein a nominal amount of electrical energy is supplied through the power coupling 78 to establish a connection between the electrical circuitry of the removable component 76 and that of the base unit 74. During the start-up mode the component processing system 4 may be inoperative, e.g. electrical circuitry on the removable component 76 does not supply electrical energy to the component processing system 4. In the start-up mode the processor 104 can be arranged not to accept information to perform a preparation process, or to perform said process. In particular, during the start-up mode the electrical energy through the power coupling is used to drive the emitter 92 and only the associated electrical circuitry (e.g. in suitable embodiments processor 104 and rectifier 102).

In embodiments the start-up mode comprises one or more sub-processes for supplying electrical energy through the power coupling 78, which are controlled by the processor 100. In embodiments the sub-process comprises increasing the electrical energy from a first amount (which can include no energy transfer, e.g. a soft start at 0 volts) to a second amount (e.g. 1-10% of the energy transferred during a preparation process). The increase in energy can be by a linear and/or curved ramp. In embodiments with PWM implemented, the first and second electrical energy amounts may be achieved by duty cycle control of electrical energy pulsed through the primary coil (e.g. a duty cycle ratio of 0% for a soft start at 0 volts).

In embodiments the sub-process comprises supplying the electrical energy for a predetermined amount of time (e.g. 100-500 micro seconds). In embodiments with PWM implemented the predetermined amount of time may be achieved by duty cycle control of electrical energy pulsed through the primary coil (e.g. during and after the predetermined amount of time the duty cycle ratio is non-zero and zero respectively).

In embodiments the sub-process comprises supplying a predetermined amount of electrical energy, including at a constant peak voltage (e.g. 1-10% of the energy transferred during a preparation process). In embodiments the sub-processes may be combined, e.g. a master process comprises a plurality of the aforedescribed sub-processes executed concurrently, wherein the master process is completed if one of the sub-processes is completed.

In embodiments the sub-process is repeated sequentially (e.g. following completion of a sub-process, without a signal emitted by the emitter 92 received by the receiver 94, the sub-process is performed again) until a predetermined number (e.g. 2-4) of sub-processes have been executed or a signal emitted by the emitter 92 is received by the receiver 94. In embodiments a subsequent sub-process is executed after a predetermined amount of time (e.g. 100-500 micro seconds) from termination of the preceding sub-process.

At condition 112 the processor 100 determines if the start-up mode has run to completion (e.g. the or each of the described sub-processes performed during start-up runs to completion). If completed, then the energy transfer process is terminated at block 110. Else, condition 114 is executed. In other embodiments the start-up process may be run indefinitely until block 114 is executed. At condition 114 the processor 100 determines if the receiver 94 has received a signal from the emitter 92 (which is driven by the electrical energy supplied in the start-up mode). If said signal has been received then the processor transitions from the start-up mode to a regulated mode at block 116. Else, then the start-up mode may be continued at block 112. It is to be understood that conditions 112 and 114 are executed concurrently.

At block 116 a regulated mode is performed, whereby the processor 100 supplies electrical energy through the power coupling 78 according to the demands of the electrical circuitry and/or component processing system 4 of the removable component 76 (communicated via the emitter 92 and receiver 94).

In embodiments (not illustrated), at condition 114 the processor 104 implements a preparation process selection sub-mode, wherein the emitter 92 is controlled to effect the supply of a nominal amount of energy to be supplied through the power coupling 78, e.g. by means of the emission of a nominal signal from the emitter 92. The nominal amount of energy may be suitable for operating the processor 104, emitter 92 and in embodiments where present the communication resources 68 (but insufficient to power the component processing system 4). The preparation process selection sub-mode may be maintained until information comprising a selection of a preparation process is received by the communication resource 68 (or other embodiment means for receiving the information). Subsequently, the processor 104 implements a preparation process execution sub-mode, wherein the emitter 92 is controlled according to the executed preparation process. Else the preparation process selection sub-mode may be maintained for a predetermined amount of time (such as 1-5 minutes) until block 110 is executed to terminate the energy transfer process.

Due to the operating of the component processing system 4 in the regulated mode (and it being inoperative in the start-up mode) it will be understood that the electrical energy transferred in the start-up mode is lower than the electrical energy transferred in the regulated mode.

In embodiments, the electrical circuitry is adapted to prevent transfer of electrical energy through the power coupling upon determination by the processor 100 of the base unit 74 and removable component 76 as being uncoupled. Said determination can be provided by the sensor 88. Said determination can be provided at any time during the aforedescribed energy transfer process. In FIG. 12, block 118 illustrates said determination performed during the regulated mode, wherein if uncoupling is determined block 110 is executed to terminate the energy transfer process, else the regulated mode is maintained at block 116.

In embodiments the emitter 92 transmits information, processed by the electrical circuitry of the base unit 74, to identify the removable component 76 and/or one or more preparation process executable by the removable component 76. The information may include an identifier unique to the removable component, wherein the one or more preparation processes performable by the identified removable component can be determined from the transmitted identifier, e.g. via a database stored on a memory, which can be implemented as a look-up table or other suitable arrangement. In a like manner identifiers for one or more of the preparation processes performable by the removable component 76 can be transmitted. The electric circuitry of the base unit 74 may enable user selection (e.g. via the user interface 42) of said one or more processes for execution. Upon transfer of electrical energy through the power coupling 78, the electrical circuitry may automatically perform said transmission. In embodiments comprising a regulated mode, said transmission may occur during the regulated mode, including upon transition from the start-up mode to the regulated mode. In embodiments the identifier may be used to authenticate the removable component 76, e.g. via comparison with a database of allowable identifiers.

In the described embodiment energy transfer process, reference to the or each processor is made for brevity. It is to be understood that the processor can be implemented as one or more processors or as other electrical circuitry in accordance with "electrical circuitry" defined herein.

In embodiments the electrically circuitry is adapted in the regulated mode to transfer with the power coupling continuously variable amounts of electrical energy (e.g. the regulated mode regulates the transfer of electrical energy with a number of states in addition to on and off). The term "continuously variable" refers to control in a continuous manner of the amount of electrical energy that each energy pulse through the power coupling supplies (e.g. by duty cycle control) rather than the on/off state of a pulse.

In embodiments (not illustrated) the removable component and base unit comprise a mechanical interface for locating the removable component and base unit in the operatively coupled configuration. The mechanical interface may comprise protrusions and corresponding cavities arranged surfaces of the removable component and base unit, which adjoin when operatively coupled.

Figure 13:
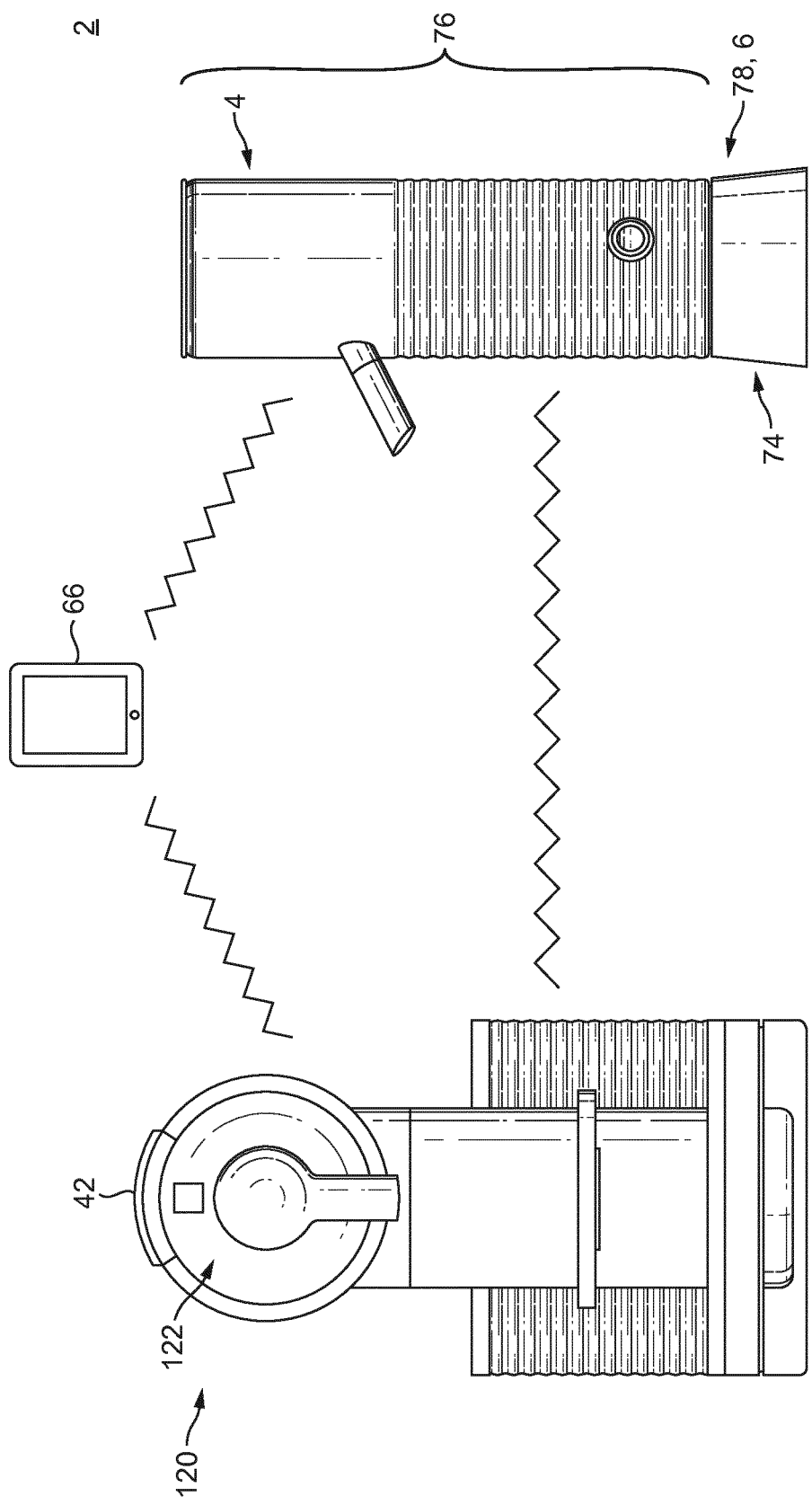
FIG. 13 is a schematic diagram showing an embodiment of the beverage or foodstuff preparation system of FIG. 1.

Referring to FIG. 13, the beverage or foodstuff preparation system 2 comprises a master beverage or foodstuff preparation machine 120 for operation with a slave removable component 76 and base unit 74 as previously described. The master beverage or foodstuff preparation machine 120 comprises a further component processing system 122 as defined herein, e.g. a component processing system 122 that is different to the particular configuration of the component processing system 4 of the removable component 76. The master beverage or foodstuff preparation machine 120 comprises electrical circuitry (not illustrated) to control the further component processing system 122 and an associated power supply (not illustrated) as described herein. The master beverage or foodstuff preparation machine 120 and removable component/base unit are operatively connected by communication resources as defined herein, e.g. via wireless communication resources.

In embodiments the electrical circuitry of the removable component 76 or base unit 74 transmits via the communication resources information to identify the removable component 76 and/or one or more preparation process performable by the component processing system 4 of the removable component 76. The information may include an identifier unique to the removable component 76, wherein the one or more preparation processed performable by the identified removable component 76 can be determined from the transmitted identifier, e.g. via a database stored on a memory, which can be implemented as a look-up table or other suitable arrangement. In a like manner identifiers for one or more of the preparation processes performable by the removable component 76 can be transmitted. In embodiments the information is stored on a processor of the removable component 76 (or an associated memory/storage device). In embodiments the information comprises a set of machine readable instructions that comprise the preparation process and are executable by the processor of the removable component 76. In embodiments the information comprises a combination of the described preceding embodiments or other suitable encoding of information.

Upon transfer of electrical energy through the power coupling 78, the electrical circuitry 6 may automatically perform said transmission. In embodiments comprising a regulated mode, said transmission may occur during the regulated mode, including upon transition from the start-up mode to the regulated mode.

In variant embodiments (not illustrated) the communication resources for transmission can be arranged on either the removable component or base unit as previously described. In embodiments, upon transfer of electrical energy through the power coupling, the electrical circuitry of the removable component and/or base unit and that of the master beverage or foodstuff preparation machine, perform an authentication process (e.g. pairing, which can include information exchange via secret key or other cryptographic algorithm), and if authenticated then said information transmission occurs. In embodiments information transmission is initiated by a user interface and is not automatic.

The master beverage or foodstuff preparation machine 120 comprises electrical circuitry adapted to receive the information to identify a preparation process performable by the component processing system 4 and based on said information determine a combined preparation process performable by the further component preparation system 122 and the component preparation system 4 of the removable component 76. In embodiments the electrical circuitry adapted to receive the information and perform said determination is arranged on one or a combination of: the master beverage or foodstuff preparation machine 120; a peripheral device 66; other device in communication with the system 2. In embodiments the electrical circuitry comprises one or more processors operable to determine from a database one or more combined preparation process. In embodiments the database is implemented as a look-up table of one or more combined preparation process looked up via entry of a preparation process of the component preparation system 4 of the removable component 76 (determined from the transmitted information) and a preparation process of the further component preparation system 122 of the master beverage or foodstuff preparation machine 120.

In embodiments the electrical circuitry of the master beverage or foodstuff preparation machine 120 is adapted to perform a combined preparation process comprising the operation of the further component processing system 122 and the component processing system 4 of the removable component 76. The component processing system 4 of the removable component 76 can be controlled by the transmission, from the master beverage or foodstuff preparation machine 120, of the aforedescribed information for selection of a preparation process. A user may select a combined preparation processes on master beverage or foodstuff preparation machine 120 (e.g. via the user interface 42) or on a peripheral device 66 or other device in communication with the system 2. The component processing systems may be operated sequentially or concurrently to each other. In embodiments the electrical circuitry to perform the combined preparation process is arranged on one or a combination of: the master beverage or foodstuff preparation machine 120; a peripheral device 66; other device in communication with the system 2.

In embodiments the further component processing system 122 comprises an extraction system and the component processing system 4 comprises a conditioning system, wherein an embodiment combined preparation process comprises the conditioning system conditioning milk for use with coffee extracted by the extraction system.

Figure 14:
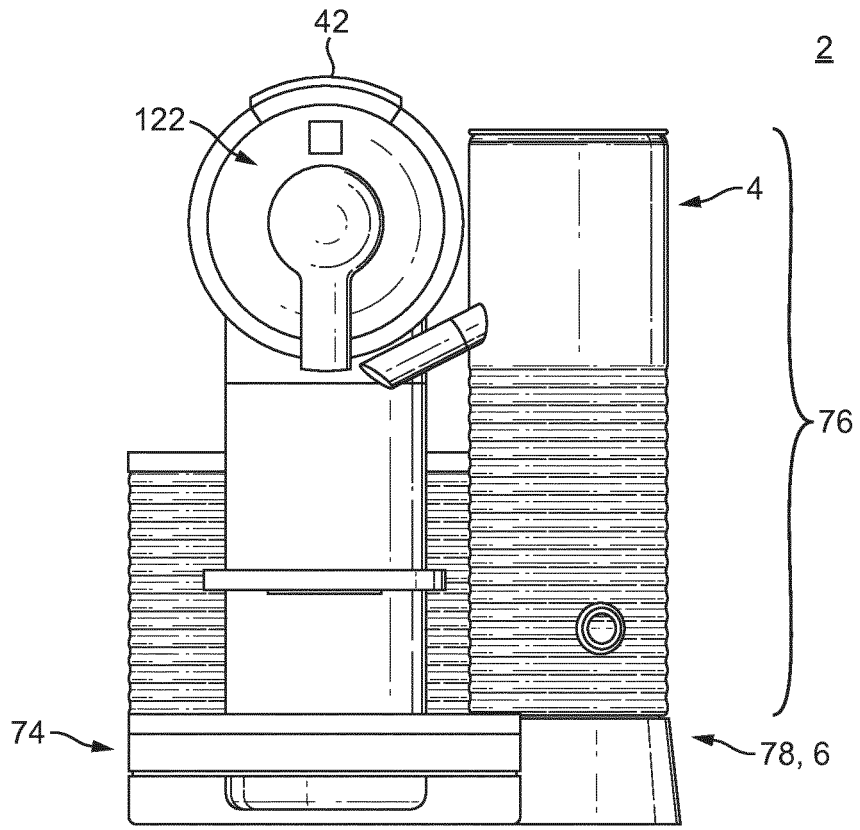
FIG. 14 is a schematic diagram showing an embodiment of the beverage or foodstuff preparation system of FIG. 1.

Referring to FIG. 14, a variant of the preceding embodiment comprises the further component processing system 122 alternatively arranged on the base unit 74. In a similar manner as for the preceding embodiment, information to identify one or more preparation process performable by the component processing system 4 of the removable component 76 is transmitted by electrical circuitry of the removable component. Combined preparation process performable by the further component preparation system 122 and the component preparation system 4 of the removable component 76 can be determined by the information with electrical circuitry of the base unit 74. In a similar manner as for the preceding embodiment, the electrical circuitry of the base unit 74 is operable to perform a combined preparation process comprising the operation of the further component processing system 122 and the component processing system 4 of the removable component 76. The component processing system 4 of the removable component 76 can be controlled by the transmission of the aforedescribed information for selection of a preparation process. A user may select said combined preparation processes on the base unit 74 (e.g. via the user interface 42) or a peripheral device or other device in communication with the system 2.

Figure 15:
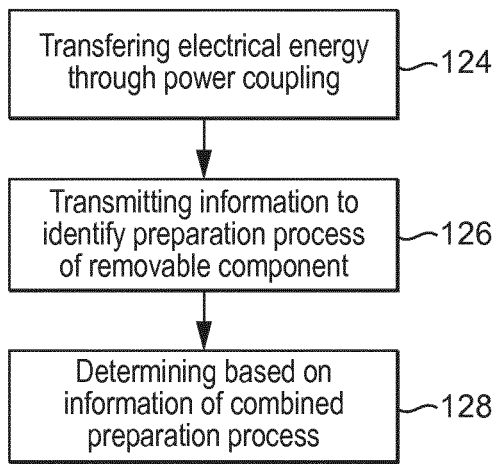
FIG. 15 is a flow chart showing an embodiment beverage preparation process for the system of FIG. 13 or 14.

Referring to FIG. 15, a method of preparing a beverage or foodstuff comprises at block 124 transferring electrical energy through a power coupling between a base unit and a removable component. At block 126 information is transmitted to identify a preparation process performable by the component processing system of the removable component. Block 124 is executed using the electrical energy transferred though the power coupling, e.g. communication resources are driven in real time with the electrical energy received by the removable component. In embodiments comprising a regulated mode the information may be transferred upon transition to the regulated mode. At block 128 it is determined, based on the transmitted information, a combined preparation process performable by a further component preparation system and the component preparation system of the removable component. As described in the preceding embodiments, said determining may be performed by electrical circuitry of one or more of the following: a master beverage or foodstuff reparation machine; a base unit; a peripheral device; other device in communication with the system. The method may further comprises performing a combined preparation process comprising the operation of the further component processing system and the component processing system of the removable component.

In the preceding embodiments processing of the signals etc. may occur at the local processor of the system, at a processor of computer device, or at any other suitable arrangement of processing resources within or in communication with the system, or a combination thereof.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware or software components, including a one or more virtual machines that can provide the described functionality. In some embodiments, the circuitry may be implemented in, or functions associated with the circuitry may be implemented by, one or more software or firmware modules. In some embodiments, circuitry may include logic, at least partially operable in hardware. In some embodiment, the processing/execution may be distributed instead of centralized processing/execution.

It will be appreciated that any of the disclosed methods (or corresponding apparatuses, programs, data carriers, etc.) may be carried out by either a host or client, depending on the specific implementation (i.e. the disclosed methods/apparatuses are a form of communication(s), and as such, may be carried out from either 'point of view', i.e. in corresponding to each other fashion). Furthermore, it will be understood that the terms "receiving" and "transmitting" encompass "inputting" and "outputting" and are not limited to an RF context of transmitting and receiving radio waves. Therefore, for example, a chip or other device or component for realizing embodiments could generate data for output to another chip, device or component, or have as an input data from another chip, device or component, and such an output or input could be referred to as "transmit" and "receive" including gerund forms, that is, "transmitting" and "receiving", as well as such "transmitting" and "receiving" within an RF context.

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example(s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

As used herein, any machine executable instructions, or compute readable media, may carry out a disclosed method, and may therefore be used synonymously with the term method, or each other.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

LIST OF REFERENCES

2 Beverage or Foodstuff Preparation System
    76 Removable component
        4 Component processing system
           Extraction system
           14 Extraction unit
                16 Capsule holder
                18 Outlet wall
           20 Drive system
           22 Inlet duct
           24 Outlet duct
           Conditioning System
           26 Whisking system
                28 Movable element
                30 Drive system
           32 Heat transfer system
           34 container
        6 Electrical circuitry
           42 User interface
           44 Sensor system
           46 Hardware resources
                48 Processing resources
                    50, 52 Processor
                    54-62 Instructions
                64 memory/Storage devices
                68 Communication resources
           88 Sensor (90 Magnetic material)
           92 Emitter
           94 Receiver
           102 Rectifier 98 Switching system
100, 104 Processor
66 Peripheral devices
70 Databases
72 Network
8 Fluid supply system
   36 Reservoir
   38 Pump system
   40 Heat transfer system
74 Base unit
   10 Power supply
   78 Power coupling
      80 Primary coil
      82 Secondary coil
      84, 86 Core
12 Container

The invention claimed is:

1. A beverage or foodstuff preparation system comprising:
a base unit;
a removable component having a beverage or foodstuff component processing system, the beverage or foodstuff component processing system comprising a component selected from the group consisting of:
   (i) an extraction unit comprising a capsule holder configured to hold a capsule, the capsule holder being operable to move between a capsule receiving position, a capsule processing position, and an intermediate ejection position in which the capsule is ejected after extraction; and
   (ii) a conditioning system comprising a whisking system comprising a movable element driven by a drive system, the conditioning system further comprising a heat transfer system configured to heat or cool a fluid;
a power coupling adapted for inductive power transfer of electrical energy between the base unit and the removable component when the removable component is coupled with the base unit;
electrical circuitry to determine coupling of the base unit and the removable component, the electrical circuitry comprising an emitter arranged on the removable component, the emitter communicatively coupled to a receiver arranged on the base unit when the removable component is coupled with the base unit,
the electrical circuitry, upon determination of the coupling, is configured to effect electrical energy transfer through the power coupling in a start-up mode, wherein electrical energy transferred in the start-up mode by the power coupling drives the emitter for establishing communication between the emitter and the receiver,
the electrical circuitry, upon receiving a corresponding signal from the receiver, is configured to transition from the start-up mode to a regulated mode, wherein electrical energy transfer in the regulated mode is regulated by communication between the emitter and the receiver, and the beverage or foodstuff component processing system is operative,
the power coupling comprises a primary coil arranged on the base unit and a secondary coil arranged on the removable component, the receiver and the emitter are arranged within the respective primary coil and secondary coil, and the electrical circuitry comprises a sensor to determine coupling of the base unit and the removable component, the sensor being external and arranged distal from the primary coil and the secondary coil; and
a separable core adjacent to the primary coil and the secondary coil when the base unit and the removable component are coupled, wherein the separable core is arranged to confine and guide a magnetic field coupling the respective primary coil and secondary coil.

2. The beverage or foodstuff preparation system according to claim 1, wherein the electrical energy transferred in the start-up mode is lower than the electrical energy transferred in the regulated mode.

3. The beverage or foodstuff preparation system according to claim 1, wherein the start-up mode comprises a process comprising increasing the electrical energy transferred in the start-up mode from a first amount to a second amount and/or transferring the electrical energy transferred in the start-up mode for a predetermined amount of time.

4. The beverage or foodstuff preparation system according to claim 3, wherein the electrical energy transferred in the start-up mode is terminated if the process is completed without a signal emitted by the emitter received by the receiver.

5. The beverage or foodstuff preparation system according to claim 4, wherein the process is repeated sequentially until a predetermined number of processes have been executed or a signal emitted by the emitter is received by the receiver.

6. The beverage or foodstuff preparation system according to claim 1, wherein the electrical circuitry is adapted in the regulated mode to transfer with the power coupling continuously variable amounts of electrical energy.

7. The beverage or foodstuff preparation system according to claim 1, wherein the electrical circuitry is configured to control the beverage or foodstuff component processing system to perform a beverage or foodstuff preparation process, whereby the electrical energy transferred in the regulated mode transmitted by the power coupling is controlled based on the beverage or foodstuff preparation process.

8. The beverage or foodstuff preparation system according to claim 1, wherein the electrical circuitry is adapted to: receive information for selection of a preparation process performable by the beverage or foodstuff component processing system and perform a preparation process based on the information.

9. The beverage or foodstuff preparation system according to claim 1, wherein the electrical circuitry is adapted, upon transfer of electrical energy transferred during the start-up mode through the power coupling, to transmit information to identify a preparation process performable by the beverage or foodstuff component processing system of the removable component,
the beverage or foodstuff preparation system comprising:
   a further component preparation system; and
   further electrical circuitry adapted to receive the information to identify a preparation process performable by the further component processing system and, based on the information, to determine a combined preparation process performable by the further component preparation system and the beverage or foodstuff component preparation system of the removable component.

10. The beverage or foodstuff preparation system according to claim 1, wherein the start-up mode comprises one or more sub-processes for supplying the electrical energy transferred in the start-up mode.

11. The beverage or foodstuff preparation system according to claim 10, wherein the one or more sub-processes are executed concurrently.

12. The beverage or foodstuff preparation system according to claim 3, wherein the process comprises increasing the amount of the electrical energy transferred in the start-up mode from the first amount to the second amount by a linear and/or curved ramp.

13. The beverage or foodstuff preparation system according to claim 12, wherein the increasing of the amount of electrical energy transferred in the start-up mode is achieved by duty cycle control of the electrical energy transferred in the start-up mode.

14. The beverage or foodstuff preparation system according to claim 12, wherein the increasing of the amount of the electrical energy is achieved by supplying the electrical energy transferred in the start-up mode at a constant magnitude.

15. The beverage or foodstuff preparation system according to claim 1, wherein each of the primary coil and the secondary coil comprises a plurality of electrically insulated circular windings of a conductive element.

16. A removable component comprising:
- a beverage or foodstuff component processing system comprising a component selected from the group consisting of:
  - (i) an extraction unit comprising a capsule holder configured to hold a capsule, the capsule holder being operable to move between a capsule receiving position, a capsule processing position, and an intermediate ejection position in which the capsule is ejected after extraction; and
  - (ii) a conditioning system comprising a whisking system comprising a movable element driven by a drive system, the conditioning system further comprising a heat transfer system configured to heat or cool a fluid;
- a secondary coil of a power coupling adapted for inductive power transfer of electrical energy from a base unit coupled with the removable component; and
- electrical circuitry comprising an emitter arranged to be communicatively coupled to a receiver arranged on the base unit,
- the electrical circuitry is configured to receive electrical energy from the secondary coil for power transfer in a start-up mode, wherein the electrical energy transferred in the start-up mode drives the emitter for establishing communication with the receiver, and
- the electrical circuitry, upon transmitting a signal from the emitter, is configured to transition from the start-up mode to a regulated mode, wherein electrical energy transferred in the regulated mode is regulated by the emitter, and the component processing system is operative;
- a power coupling adapted for inductive power transfer of electrical energy between the base unit and the removable component when the removable component is coupled with the base unit,
- the power coupling comprises a primary coil arranged on the base unit and the secondary coil arranged on the removable component, the receiver and the emitter are arranged within the respective primary coil and secondary coil, and the electrical circuitry comprises a sensor to determine coupling of the base unit and the removable component, the sensor being external and arranged distal from the primary coil and the secondary coil,
- the power coupling further comprises a separable core adjacent to the primary coil and the secondary coil when the base unit and the removable component are coupled, wherein the separable core is arranged to confine and guide a magnetic field coupling the respective primary coil and secondary coil.

* * * * *